US007884755B2

United States Patent
Fehrenbach et al.

(10) Patent No.: US 7,884,755 B2
(45) Date of Patent: Feb. 8, 2011

(54) FILLING LEVEL RADAR WITH VARIABLE TRANSMITTING POWER

(75) Inventors: Josef Fehrenbach, Haslach (DE);
Daniel Schultheiss, Hornberg (DE);
Christoph Mueller, Oppenau (DE);
Bernhard Corbe, Schutterwald (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 12/325,676

(22) Filed: Dec. 1, 2008

(65) Prior Publication Data

US 2009/0085795 A1    Apr. 2, 2009

Related U.S. Application Data

(63) Continuation of application No. 11/606,313, filed on Nov. 28, 2006, now Pat. No. 7,460,057.

(60) Provisional application No. 60/740,747, filed on Nov. 30, 2005.

(30) Foreign Application Priority Data

Nov. 30, 2005   (DE)   .............. 10 2005 057 094

(51) Int. Cl.
*G01S 13/08*   (2006.01)
*G01F 23/00*   (2006.01)
*G01F 23/284*  (2006.01)
*G01S 7/40*    (2006.01)
*G01S 7/00*    (2006.01)
*G01S 13/00*   (2006.01)
*G01F 23/296*  (2006.01)

(52) U.S. Cl. .................. 342/124; 342/82; 342/118; 342/128; 342/130; 342/131; 342/134; 342/165; 342/173; 342/175

(58) Field of Classification Search ............. 342/13–20, 342/82, 88, 118, 120–124, 128, 130–132, 342/134–144, 165–175, 195, 200–204; 455/39, 455/500, 507, 517–522, 91, 115.1, 115.3, 455/127.1–127.3; 324/629–648; 367/13, 367/87, 99–102, 137; 73/290 R, 304 R, 304 C, 73/290 B, 290 V
See application file for complete search history.

(56) References Cited

U.S. PATENT DOCUMENTS 3,579,238 A * 5/1971 Haeff et al. ................ 342/14

(Continued)

FOREIGN PATENT DOCUMENTS

DE    23 12 145    9/1973

(Continued)

OTHER PUBLICATIONS

Lange et al., "Taschenbuch der Hochfrequenztechnik Grundlagen, Komponenten, Systeme," Springer-Verlag, Berlin, 1992, 14 sheets.

(Continued)

*Primary Examiner*—Bernarr E Gregory
(74) *Attorney, Agent, or Firm*—Fay Kaplun & Marcin, LLP

(57) ABSTRACT

A level measuring instrument has a variable transmitting power for measuring a filling level in a tank. The level measuring instrument includes a generator unit generating one of a first oscillator signal and a second oscillator signal. The generator unit generates a transmit signal from one of the first oscillator signal and the second oscillator signal. The level measuring instrument includes further a controller controlling the generator unit. The generator unit generates one of first and second transmitting powers for the transmit signal.

18 Claims, 3 Drawing Sheets

U.S. PATENT DOCUMENTS

| | | | |
|---|---|---|---|
| 3,733,604 A * | 5/1973 | Smith | 342/88 |
| 3,739,379 A * | 6/1973 | Davis | 342/88 |
| 3,985,030 A | 10/1976 | Charlton et al. | |
| 4,044,354 A | 8/1977 | Bosher et al. | |
| 4,225,866 A * | 9/1980 | Levine | 342/173 |
| 4,319,246 A * | 3/1982 | Fitz | 342/175 |
| 4,336,538 A * | 6/1982 | Radford | 342/175 |
| 4,727,311 A * | 2/1988 | Walker | 324/640 |
| 4,758,839 A * | 7/1988 | Goebel et al. | 342/122 |
| 4,805,453 A | 2/1989 | Haynes | |
| 5,014,010 A * | 5/1991 | Helms et al. | 324/640 |
| 5,160,933 A * | 11/1992 | Hager | 342/174 |
| 5,452,611 A * | 9/1995 | Jones et al. | 73/290 V |
| 5,543,720 A | 8/1996 | Edvardsson | |
| 5,594,449 A * | 1/1997 | Otto | 342/124 |
| 5,689,265 A * | 11/1997 | Otto et al. | 342/124 |
| 5,767,685 A * | 6/1998 | Walker | 324/640 |
| 5,898,401 A * | 4/1999 | Walls | 342/82 |
| 6,130,636 A * | 10/2000 | Severwright | 342/120 |
| 6,414,627 B1 * | 7/2002 | McEwan | 342/134 |
| 6,462,705 B1 * | 10/2002 | McEwan | 342/175 |
| 6,628,229 B1 * | 9/2003 | Johnson et al. | 342/124 |
| 6,650,128 B2 * | 11/2003 | Sanders | 73/304 R |
| 6,867,729 B2 * | 3/2005 | Berry et al. | 342/124 |
| 7,053,630 B2 * | 5/2006 | Westerling et al. | 324/644 |
| 7,460,057 B2 * | 12/2008 | Fehrenbach et al. | 342/124 |
| 2004/0004905 A1 * | 1/2004 | Lyon et al. | 367/13 |
| 2004/0080324 A1 * | 4/2004 | Westerling et al. | 324/644 |
| 2005/0024259 A1 | 2/2005 | Berry et al. | |

FOREIGN PATENT DOCUMENTS

| | | |
|---|---|---|
| DE | 103 22 373 | 12/2004 |
| EP | 0 451 987 | 10/1991 |
| EP | 1 182 434 | 2/2002 |
| EP | 0 592 584 | 4/2004 |
| WO | 02 / 35190 | 5/2002 |

OTHER PUBLICATIONS

Nuhrmann, "Das Grobe Werkbuch Elektronik," Franzis Verlag GmbH, 1998, 3 sheets.

Rint et al., "Handbuch Fur Hochfrequenz-Und Elektro-Techniker," Dr. Alfred Huthig Verlag Heidelberg, 1984, 7 sheets.

\* cited by examiner

FILLING LEVEL RADAR WITH VARIABLE TRANSMITTING POWER

CROSS REFERENCE TO RELATED APPLICATIONS:

This application is a Continuation U.S. patent application Ser. No. 11/606,313 filed Nov. 28, 2006 issued as U.S. Pat. No. 7,460,057 which claims the benefit of the filing date of U.S. Provisional Patent Application Ser. No. 60/740,747 filed Nov. 30, 2005, and German Patent application Serial No. 10 2005 057 094.1 filed Nov. 30, 2005, the disclosures of which are hereby incorporated herein by reference.

FIELD OF THE INVENTION

This invention relates to level measuring. In particular, this invention relates to a filling level measuring instrument with variable transmitting power for measuring a filling level in a tank, a generator unit and a controller for generating variable transmitting power, and a method for measuring a filling level in a tank.

TECHNICAL BACKGROUND

Known filling level measuring instruments for contactless measuring have an antenna, which transmits or receives signals (radar or microwave, ultrasound) in order to determine the filling level of a medium, e.g. in a filling material container. The antenna of such a level measuring instrument is then arranged for instance inside a container.

The quality of the measuring signals received at level measuring with a level measuring instrument is largely dependent on the quality of the transmitting-/receiving unit. In particular, the strength or amplitude of the receive signal is critical therein. If the amplitude is small, e.g. because the measuring signal on its way from the transmitter to the filling material and back again was strongly attenuated, the quality of the gating and thus the measuring result deteriorates. On the other hand, if the amplitude of the signal received is too high, the receiving unit will overload. This may result in a measuring error.

SUMMARY OF THE INVENTION

According to an exemplary embodiment of this invention, a level measuring instrument with variable transmitting power for measuring a filling level in a tank is provided, the level measuring instrument comprising a generator unit for generating a transmit signal and a controller for controlling the generator unit, wherein the generator unit is configured for selectively generating a first transmitting power of the transmit signal or a second transmitting power of the transmit signal.

E.g., the generator unit according to this exemplary embodiment of this invention may always generate a transmit signal of the first transmitting power, when environmental conditions are relatively good, i.e. small losses of the transmit signal on its way through a filling material container back to the level measuring instrument may be anticipated. In this case, the transmitting power is then set correspondingly low. On the other hand, under more difficult environmental conditions, e.g. if the filling material is relatively far away from the level measuring instrument, or in case of an atmosphere with relatively high absorption, the generator unit may set the transmitting power of the transmit signal correspondingly high (according to the second transmitting power). This may ensure that even under more difficult conditions, a sufficiently strong receive signal can make its way back to the detector of the level measuring instrument, so that the quality of the measuring result is maintained.

In other words, this may be done by adapting the transmitting power so that the levels of the receive signals are optimal, even under widely varying environmental conditions.

According to another exemplary embodiment of this invention, the generator unit comprises a first oscillator for generating a first oscillator signal and a second oscillator for generating a second oscillator signal, wherein the controller is configured for selectively driving the first oscillator or the second oscillator.

Depending on whether the first oscillator signal or the second oscillator signal is actually generated, either a transmit signal with a first (lower) transmitting power, or a transmit signal with a second (higher) transmitting power, is output.

This may be done e.g. in that both oscillators deliver different powers (i.e. for instance they have different dimensions), or in that the output power of the second oscillator is amplified more strongly than the output power of the first oscillator, or else in that the output power of the first oscillator is attenuated (wherein both oscillators can then e.g. be configured in the same way).

According to another exemplary embodiment of this invention, the level measuring instrument comprises a reference signal retrieval point (tap) from the first oscillator signal or the second oscillator signal.

With level measuring instruments such a tap may be used e.g. for extracting a reference signal according to the pulse-running time principle before the transmit signal is delivered to the antenna and leaves the level measuring instrument. This extracted signal may thereafter be used to determine the running time of the transmit signal.

According to another exemplary embodiment of this invention, the level measuring instrument further comprises an attenuation element for setting attenuation of the first oscillator signal.

Thus, e g. both oscillators may be configured in the same way, with the output signal of the first oscillator being attenuated accordingly, so that eventually two different transmitting powers are provided. Such an attenuation element may be integrated in the waveguide between the first oscillator and the reference signal extraction point.

According to another exemplary embodiment of this invention, the attenuation element is configured as an attenuation mat to be adhered to a substrate.

Thus, the attenuation element is not integrated into the line, but rather mounted near the line. By modifying the size, thickness, or another parameter of the attenuation mat, the attenuation factor may be set adequately, depending on the requirements on the level measuring instrument.

According to another exemplary embodiment of this invention, the attenuation element has variable, controllable attenuation, wherein the controller is configured for controlling the attenuation element.

Thus, according to this exemplary embodiment of this invention, the attenuation may be set individually according to the requirements. In this case may be possible for instance to configure the generator unit with one oscillator only, the output power of which is attenuated adequately if the power of the measuring signal is too high.

Of course, in this case, too, it may be possible to provide two oscillators, with both oscillators being configured e.g. in the same way, i.e. imitating the same power.

According to another exemplary embodiment of this invention, the level measuring instrument further has a transmission amplifier for setting amplification of the second oscillator signal.

Here again, e.g. a total of one oscillator only is provided, the output power of which is amplified adequately, or not amplified, depending on the environmental conditions.

Of course, in his case, too, it may be possible to provide two identical oscillators, with the power of one of them being amplified and, in addition, the power of the other one may be attenuated e.g. by an attenuation mat so that the difference in power between both powers further increases.

According to another exemplary embodiment of this invention, the level measuring instrument further comprises a directional coupler with a first input, a second input, a first output and a second output, wherein the first input of the directional coupler is connected to the first oscillator, and the second input of the directional coupler is connected to the second oscillator. In addition, the first output of the directional coupler is configured as a retrieval point of the reference signal, and the second output of the directional coupler is configured for outputting the transmit signal. The directional coupler is additionally configured for attenuating a signal, which is fed at the first input and output at the second output.

E.g. a signal, which is entered at the first input and output at the first output, may be attenuated much less strongly. Also, a signal, which is entered at the second input and output at the second output, may be attenuated much less strongly, whereas such a signal entered at the second input, if it is output at the first output, is strongly attenuated.

In this way, the level difference between both oscillator signals may be further increased. Thereby, the attenuation mat or the amplifier may possibly be omitted completely.

According to another exemplary embodiment of this invention, the directional coupler is configured as a symmetric or asymmetric hybrid coupler.

Such a symmetric or asymmetric hybrid coupler may be integrated easily into the circuit.

According to another exemplary embodiment of this invention, the level measuring instrument is configured as a pulse radar system. The first and second oscillator signals are electromagnetic pulses.

Of course, the oscillators may also be configured so as to emit ultrasonic waves. In this case, the level measuring instrument is an ultrasonic measuring instrument.

According to another exemplary embodiment of this invention, the level measuring instrument further comprises a receiving unit, wherein the controller is coupled with the receiving unit, and wherein the controller is configured for controlling the generator unit so that the first transmitting power is generated when the strength of the receive signal exceeds a threshold value.

In this way, test measurements may be carried out in order to find out whether the power received is within an acceptable range. If the signal strength received exceeds an upper threshold value, it may be possible e.g. to switch from the second oscillator to the first oscillator, or it may be possible to increase attenuation so that the power of the transmit signal decreases. On the other hand, e.g. if the receive signal has a strength, which lies below a second threshold value, the power of the transmit signal may be increased by adequately driving the generator unit. E.g., for this purpose, switching from the first oscillator to the second oscillator takes place, or attenuation is decreased.

Of course, it may be possible to provide further additional oscillators and possibly corresponding attenuation elements or amplifiers, e.g. in order to dispose of more than two (discrete) transmitting powers.

According to another exemplary embodiment of this invention, receipt, determination of power, and comparison with the threshold value of the receive signals are performed automatically.

E.g., such signal strength measurements may be performed automatically at regular intervals. Thus, a mostly continuous regulation of the transmitting power may take place, which is respectively adapted to external conditions, If the transmitting power can be varied continuously (not in discrete steps), then it may be attempted first of all to still detect even small receive signals by means of as much transmitting power as possible. Due to an evaluation of the useful signal strength, the transmitting power may then be reduced until the receiving level is in the optimal range of the receiver.

According to another exemplary embodiment of this invention, a generator unit for generating different transmitting powers of a transmit signal for measuring a filling level is provided.

According to another exemplary embodiment of this invention, a method for measuring a filling level in a tank is provided, wherein a generator unit for selectively generating a first transmitting power or a second transmitting power of a transmit signal is driven, and the transmit signal is generated accordingly, selectively with either the first transmitting power or the second transmitting power.

Thereby a method is provided, by which the transmitting power may be adapted so that the receive signals are respectively optimized.

According to another exemplary embodiment of this invention, the method further comprises receiving a receive signal, determining a power of the receive signal, and driving the generator unit so as to generate the first transmitting power if the signal strength of the receive signal exceeds a threshold value.

According to another exemplary embodiment of this invention, the generator unit comprises a first oscillator for generating a first oscillator signal and a second oscillator for generating a second oscillator signal.

According to another exemplary embodiment of this invention, the generator unit controls a variable attenuation stage or a variable amplification stage depending on a defined signal strength of the receive signal, wherein only one oscillator for generating the transmitting power is implemented.

According to another exemplary embodiment of this invention, the generator unit controls the variable attenuation stage or the variable amplification stage independently from the signal strength of the receive signal.

Further exemplary embodiments, objects, and advantages of the invention are apparent from the subclaims.

Hereafter, with reference to the figures, preferred exemplary embodiments of this invention will be described.

BRIEF DESCRITPION OF DRAWINGS

The views in the figures are schematic and not to scale.

DETAILED DESCRIPTION OF THE INVENTION

In the following description of the figures, the same reference symbols will be used for identical or similar items.

Figure 1:
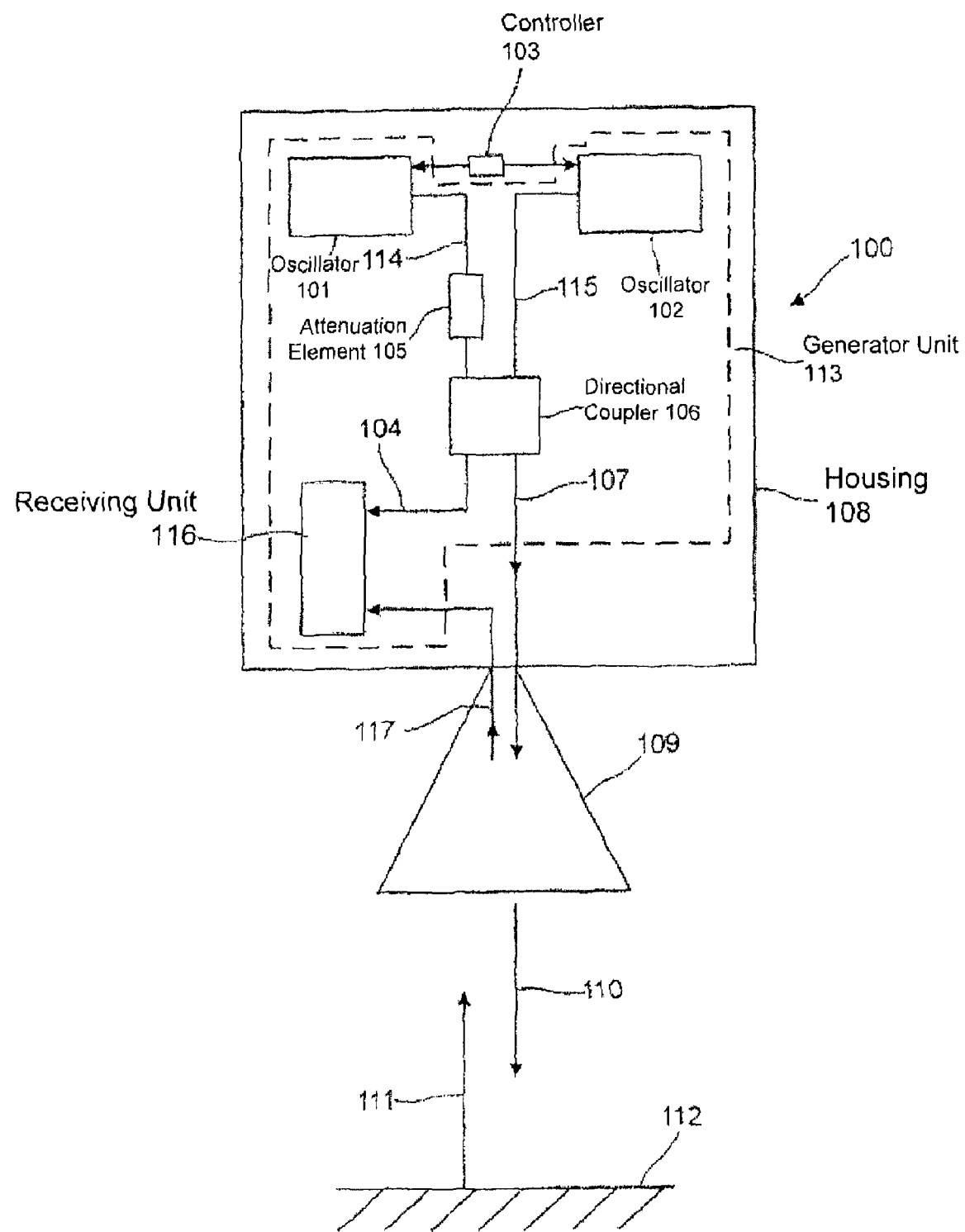
FIG. 1 shows a schematic cross-sectional view of a level measuring instrument according to an exemplary embodiment of this invention.

FIG. 1 shows a schematic cross-sectional view of a filling level radar 100 according to an exemplary embodiment of this invention. The filling level radar 100 has an antenna 109 and a housing 108, which accommodates the generator unit 113, the controller 103, and the receiving unit 116. In the generator unit 113, transmit signals 107 are generated, which are delivered to the antenna 109, and are then emitted as transmit signals 110 towards the filling material 112. The transmit signals 110 are then reflected at the filling material surface 112, and received as reflected signals 111 by the antenna 109, and thereafter supplied as signals 117 to the receiving unit 116, and correspondingly evaluated therein.

E.g., the generated transmit signals 107 are electromagnetic high frequency signals, as they are typically used for radar measurements. In this case, frequencies lie in e.g. in the gigahertz range, in particular in the range between 5 GHz and 100 GHz.

Of course, the level measuring instrument represented in FIG. 1 may also be configured as an ultrasonic instrument. In this case, the generated signals are not electromagnetic signals, but sound signals, which are generated e.g. by the oscillators 101, 102.

In the exemplary embodiment represented in FIG. 1, the generator unit 113 comprises two oscillators 101, 102, which respectively generate one oscillator signal 114, 115. The oscillator signal 114 generated by the first oscillator unit 101 is attenuated via an attenuation element 105. Both signals 114 (via attenuation element 105), and 115 then run into a directional coupler 106, wherein a reference signal 104 is tapped or derived. The output signal 107 is then forwarded to the antenna.

As the dynamic range of a conventional pulse radar system is limited both in the HF and receiving range, according to the invention, for different applications, different transmitting levels are used (which in the case of FIG. 1 are generated by the first oscillator 101 together with the attenuation element 105 or by the second oscillator 102).

The attenuation element 105 is e.g. configured as an attenuation mat, which may be dimensioned adequately.

However, the attenuation element 105 can also be configured as a variable attenuation element, which is driven adequately by the controller 103 so that the attenuation may be modified automatically during measuring.

The controller 103 is connected to the two oscillators 101, 102 so as to be able to drive both oscillators 101, 102 individually. Thus, the first oscillator 101 is driven for instance by the controller 103 if low transmitting power is desired. The second oscillator 102 is driven for instance by the controller 103 if high transmitting power is desired.

Figure 2:
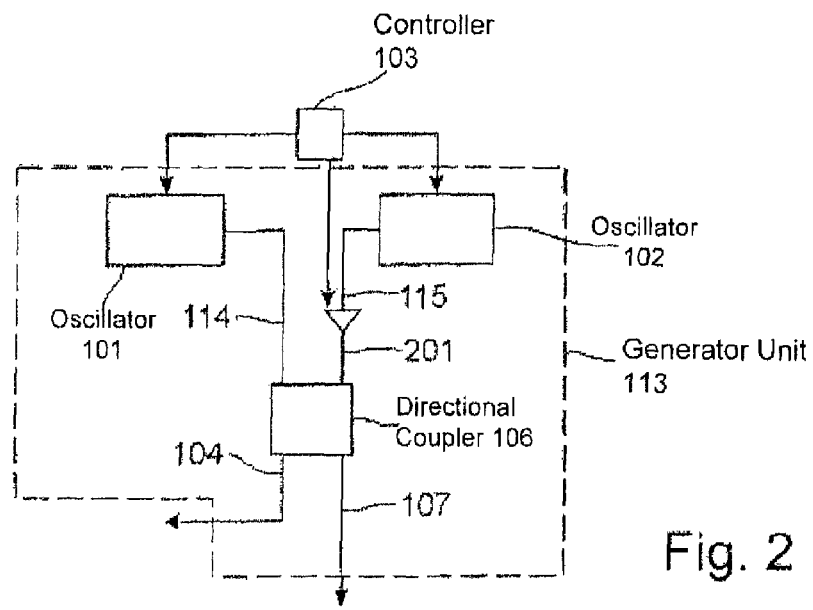
FIG. 2 shows a schematic block diagram of a generator unit and a controller according to an exemplary embodiment of this invention.

FIG. 2 shows a schematic block diagram of a generator unit 113 and a controller 103 according to another sample embodiment of this invention. In the transmit path 115 of the second oscillator 102, an amplifier element 201 is provided, which is meant for amplifying the second oscillator signal 115. This amplifier element 201 can also be connected to the controller 103 so that the amplification may be controlled.

Figure 3:
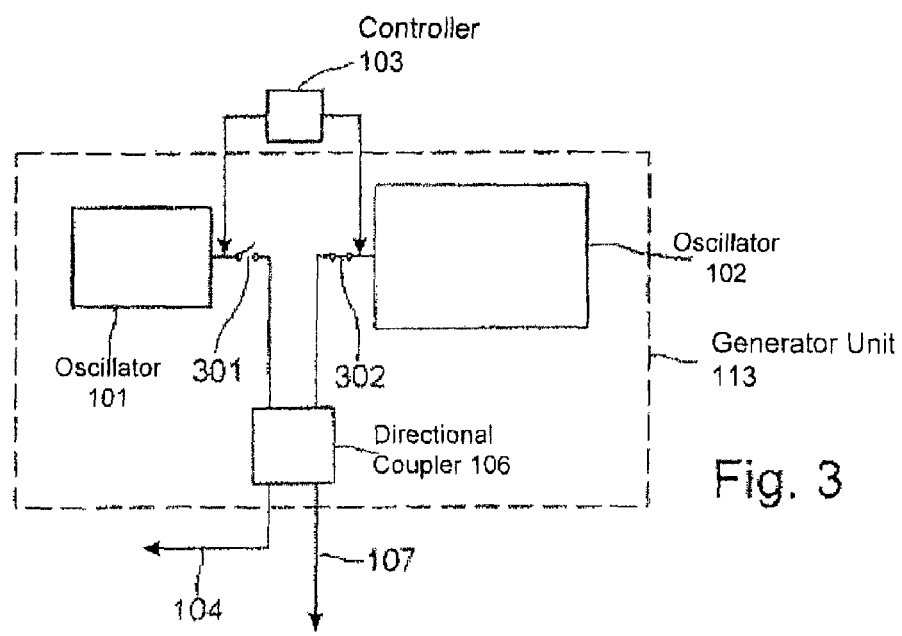
FIG. 3 shows a schematic block diagram of a generator unit and a controller according to another exemplary embodiment of this invention.

FIG. 3 shows a schematic block diagram of a generator unit 113 and a controller 103 according to another sample embodiment of this invention. Herein, the two oscillators 101, 102 are dimensioned differently, i.e. they have different output powers. This can be done e.g. in that the oscillators 101, 102 have different operating states, such as e.g. different gate bias voltages (for FET oscillators) or different operating voltages. Such oscillators can be configured e.g. as GaAs field effect transistor oscillators. However, other oscillators are equally possible, in particular (in case of an ultrasonic level measuring instrument) adequate acoustic oscillators.

In addition, switches 301, 302 are provided, which may be switched adequately by the controller 103 so that according to requirements, either one oscillator 101 or the other oscillator 102 is connected.

Figure 4:
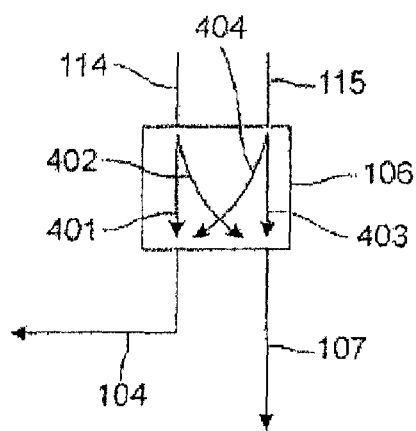
FIG. 4 shows a schematic view of a directional coupler according to an exemplary embodiment of this invention.

FIG. 4 shows a schematic view of a directional coupler 106 according to an exemplary embodiment of this invention. This directional coupler 106 is configured e.g. as an asymmetric hybrid coupler, and can be integrated into the circuit 113.

The incoming signal 114 of the first oscillator 101 travels through the directional coupler e.g. with a relatively low attenuation of −1 dB in order to be then picked up at the first output 104 (the tap for the reference signal). This is represented by reference symbol 401.

However, if the input signal 114 of the first oscillator 101 is picked up at the second output (as transmit signal 107), then it is attenuated by the directional coupler on its way 402 by e.g. −10 dB. Of course, higher or lower attenuation can also be performed according to the design of the directional coupler 106 (this is true for the case of an asymmetric hybrid coupler). For symmetric hybrid couplers, attenuations are the same in both signal directions (401 and 402).

Similarly, the signal 115 coming from the second oscillator 102 is attenuated on its way through the directional coupler towards the antenna by only −1 dB (represented by reference symbol 403). However, if the second signal 115 travels transversely to the directional coupler along the arrow 404 in order to be carried to the output 104 (tap), then it is accordingly attenuated more strongly, e.g. by −10 dB.

I.e., the controller 103 selectively drives either the first oscillator 101 or the second oscillator 102. The attenuation for one of both oscillator paths can be generated by means of an adhesive attenuation mat. It may also be possible to provide equalization of both oscillators. This equalization is performed by varying the supply voltage or the operating state of the oscillator. Thereby, level differences of both oscillators may be obtained. Also, a downstream amplifier (between hybrid coupler and antenna) may be provided (not shown in the figures), which is active at all times.

By using an asymmetric hybrid coupler 106, it is possible to further increase the level difference between both oscillators 101, 102. Thereby, the attenuation mat or the attenuation element 105 may possibly be omitted completely or at least configured considerably smaller.

Figure 5:
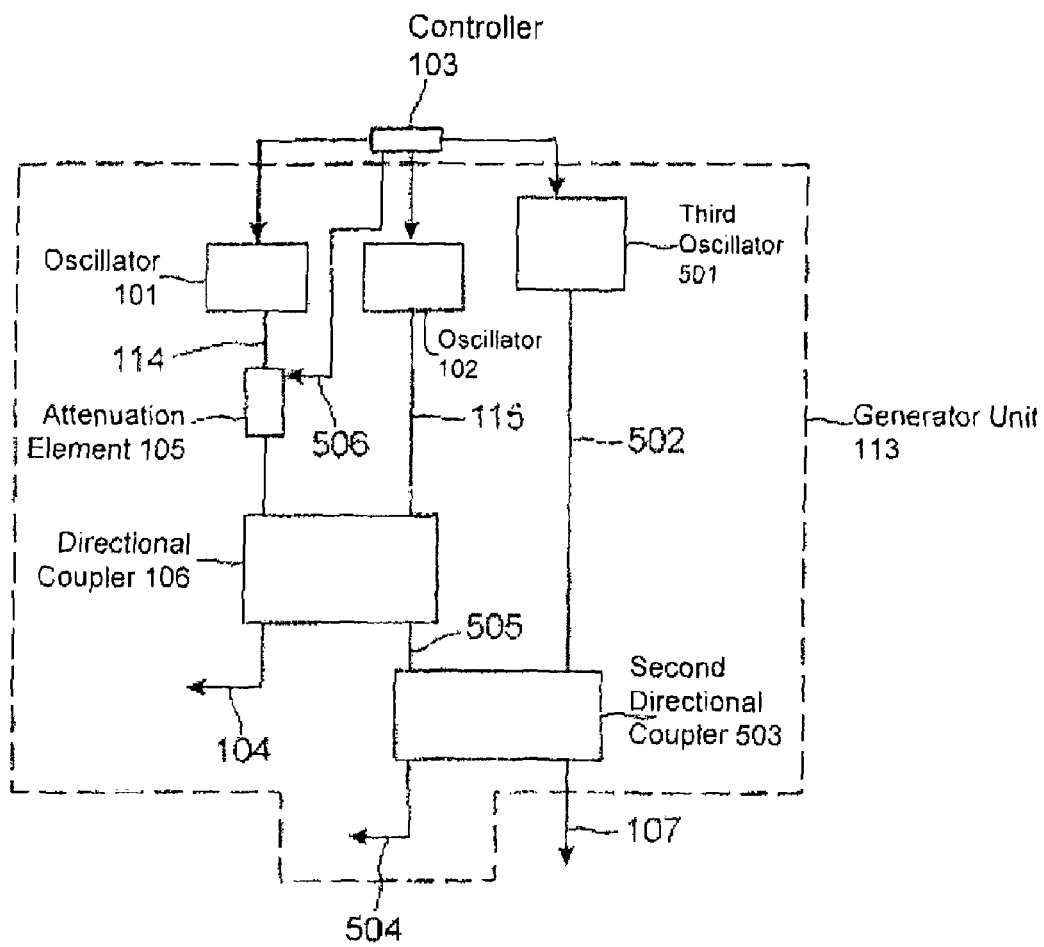
FIG. 5 shows a schematic block diagram of a generator unit and a controller according to another exemplary embodiment of this invention.

FIG. 5 shows another schematic block diagram of a generator unit 113 with the controller 103 according to another sample embodiment of this invention. As may be seen in FIG. 5, the generator unit 113 has three different separate oscillators 101, 102, 501, wherein the third oscillator 501 is designed to deliver a higher transmitting power than the first two oscillators 101, 102.

All three oscillators 101, 102, 501 are driven by the controller 103. The output signal of the first oscillator 102 is attenuated by the attenuation element 105 before it is supplied to the directional coupler 106. The attenuation can be set by the controller 103 via the line 506. The second oscillator signal 115 of the second oscillator 102 is also supplied to the directional coupler 106. The directional coupler 106 now ensures that tapping 104 of a reference signal from the first oscillator signal or the second oscillator signal (depending on driving, i.e. depending on whether the first oscillator or the second oscillator is activated) is performed. In addition, the directional coupler 106 ensures that an output signal 505 is generated, which is e.g. only slightly attenuated.

This output signal 505 is supplied to a second directional coupler 503. In addition, the second directional coupler 503 is supplied with a third oscillator signal 502 by the third oscillator 501. This third oscillator signal 502 has higher power than output signal 505.

The second directional coupler 503 may now ensure that on the one hand, a transmit signal 107 is output, which is only slightly attenuated, and that on the other hand, a second tapping 504 is performed, as a second reference signal.

According to another exemplary embodiment of this invention, tap 104 is not provided, but only tap 504.

In the exemplary embodiment shown in FIG. 5, it may thus be possible to generate three different output transmitting powers of the transmit signal 107, depending on which of the three oscillators 101, 102, 501 is driven by the controller 103. A large dynamic range may thus be provided so that the transmitting power may respectively be adapted to the corresponding application. Of course, it may also be possible to integrate further oscillators into the generator unit 113 so that further output powers may be generated. Thereby, the dynamic range of the filling level measuring device may further be increased.

Figure 6:
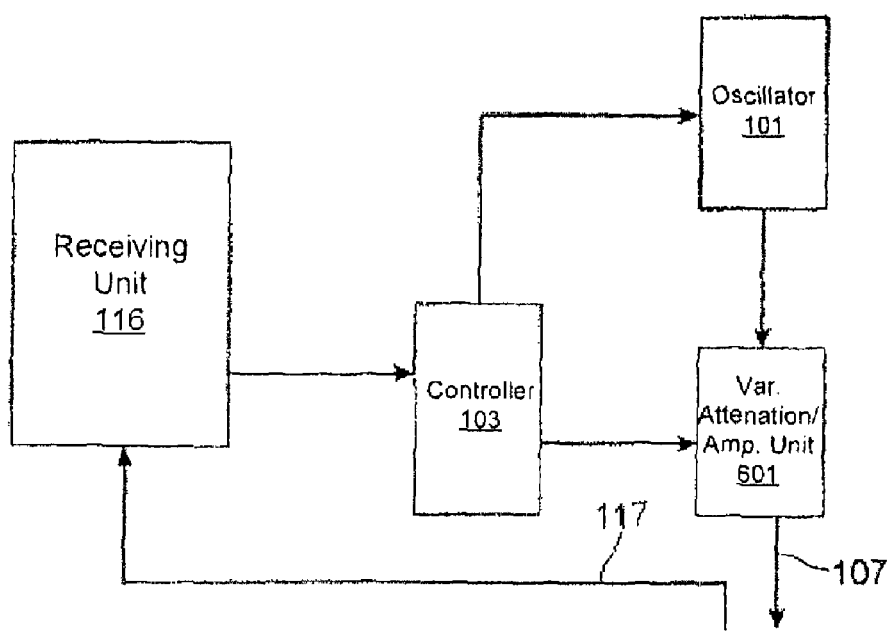
FIG. 6 shows a schematic block diagram of a generator unit and a controller according to another exemplary embodiment of this invention.

In the exemplary embodiment shown in FIG. 6, only one transmitting oscillator 101 is made, which generates different transmitting levels 107 by means of a variable attenuation/amplification unit 601. The variable attenuation/amplification unit 601 is then driven by the controller 103. From the receiving unit 116, it receives adequate information in order to increase or decrease the transmit level. The variable attenuation/amplification unit 601 may be configured in different ways. E.g. as an amplifier or as a variable attenuation member.

Of course, the various exemplary embodiments represented may be combined with each other at will.

The configuration of the invention is not limited to the preferred embodiments represented in the figures. Instead, a plurality of variants can be envisaged using the represented solution and the principle according to the invention even for embodiments of a basically different kind.

Additionally, it is to be noted that "comprising" does not exclude any other items or steps, and that "a" or "an" do not exclude a plurality. Furthermore, it is to be noted that features or steps having been described with reference to one of the above exemplary embodiments can also be used in combination with other features or steps of other embodiments described above. Reference numerals in the claims are not to be construed as limitations.

The invention claimed is:

1. A level measuring instrument with variable transmitting power for measuring a filling level of a medium stored inside a tank, the level measuring instrument comprising:
   a generator unit generating one of a first oscillator signal and a second oscillator signal, the generator unit generating a transmit signal from one of the first oscillator signal and the second oscillator signal; and
   a controller controlling the generator unit;
   wherein the generator unit generates one of first and second transmitting powers for the transmit signal.

2. The level measuring instrument according to claim 1, wherein the generator unit comprises:
   a first oscillator generating the first oscillator signal;
   a second oscillator generating the second oscillator signal;
   wherein the controller drives one of the first oscillator the second oscillator.

3. The level measuring instrument according to claim 2, further comprising:
   a directional coupler including a first input, a second input, a first output and a second output;
   wherein the first input of the directional coupler is connected to the first oscillator and the second input is connected to the second oscillator;
   wherein the first output of the directional coupler is a tap which taps the reference signal, and wherein the second output outputs the transmit signal; and
   wherein the directional coupler attenuates a signal, the signal being fed at the first input and being output at the second output.

4. The level measuring instrument according to claim 3, wherein the directional coupler is one of an asymmetric coupler and a symmetric hybrid coupler.

5. The level measuring instrument according to claim 1, further comprising:
   a tap tapping a reference signal from one of the first oscillator signal and the second oscillator signal.

6. The level measuring instrument according to claim 1, further comprising:
   an attenuation element setting attenuation of the first oscillator signal.

7. The level measuring instrument according to claim 6, wherein the attenuation element is an attenuation mat which is adhered to a substrate.

8. The level measuring instrument according to claim 6, wherein the attenuation element has variable, controllable attenuation; and wherein the controller controls the attenuation element.

9. The level measuring instrument according to claim 1, further comprising:
   a transmission amplifier setting amplification of the second oscillator signal.

10. The level measuring instrument according to claim 1, wherein the first and second oscillator signals are electromagnetic signals; and wherein the level measuring instrument is a filling level radar.

11. The level measuring instrument according to claim 1, wherein the level measuring instrument is a pulse radar system.

12. The level measuring instrument according to claim 1, further comprising:
   a receiving unit determining a signal strength of a receive signal;
   wherein the controller is coupled to the receiving unit; and
   wherein the controller generates the first transmitting power when the signal strength of the receive signal exceeds a threshold value.

13. The level measuring instrument according to claim 12, wherein (a) receipt of the received signal, (b) determination of the signal strength, and (c) comparison the threshold value to the receive signal strength are performed automatically.

14. A method for measuring a filling level of a medium stored inside a tank, the method comprising the steps of:
   generating one of a first oscillator signal and a second oscillator signal;

controlling the generator unit to generate for a transmit signal one of a first transmitting power and a second transmitting power;

generating the transmit signal which corresponds to one of the first transmitting power and the second transmitting power;

receiving a receive signal, which is a reflection of the transmit signal reflected from the medium stored inside the tank; and determining the filling level of the medium inside the tank by determining the running time of the transmit signal.

15. The method according to claim 14, further comprising the steps of:

determining a signal strength of the receive signal; and controlling the generator unit so that the first transmitting power is generated when the signal strength of the receive signal exceeds a threshold value.

16. The method according to claim 15, further comprising the step of:

wherein the generator unit controls controlling, by the generator unit, one of a variable attenuation stage and a variable amplification stage as a function of a predetermined signal strength of the receive signal; and wherein the generator unit includes a single oscillator which generates the transmitting power.

17. The method according to claim 14, wherein the generator unit comprises a first oscillator which generates the first oscillator signal, and a second oscillator which generates the second oscillator signal.

18. The method according to claim 14, further comprising the step of:

controlling, by the generator unit, one of the variable attenuation stage and the variable amplification stage independently from the signal strength of the receive signal.

* * * * *